United States Patent Office 3,310,604
Patented Mar. 21, 1967

3,310,604
POLYURETHANES HAVING DISPERSED THERE-
IN HIGH AND LOW MOLECULAR WEIGHT
POLYOLEFINS
Samuel Steingiser, Gert F. Baumann, and Clarence Louis
Gable, Bridgeville, Pa., assignors to Mobay Chemical
Company, Pittsburgh, Pa., a corporation of Delaware
No Drawing. Filed May 4, 1964, Ser. No. 364,829
17 Claims. (Cl. 260—859)

This invention relates to elastomeric polyurethanes and to improved processing of the same. More particularly, it relates to polyurethane elastomers having improved melt flow and mold release properties.

Heretofore, in the processing of elastomeric compositions, including polyurethane elastomers, difficulties have been encountered, especially with high molecular weight products, wherein suitable flow properties are not obtainable and mold release is very poor. Such a problem has previously been dealt with by including flow agents in these elastomeric products. Some such compounds in common use are stearic acid and stearates of zinc, barium, aluminum, calcium and so on. However, although these compounds are suitable for other types of elastomeric materials because they are inert therein, they are disadvantageous for use in polyurethane elastomers since they promote the breakdown of the polyurethane polymer, especially in the presence of water.

Some compounds which have been alternatively proposed as lubricants for polyurethanes, therefore, are the natural waxes and oils but the use of such agents is not satisfactory since they tend to migrate out of the elastomer and form a coating on the surface of the product. This blooming is not only detrimental to the appearance of the product, but it may also impair its desirable physical and mechanical properties. In addition, waxes are substantially incompatible and difficult to incorporate into a polyurethane elastomeric composition making their use not practical.

Further, in using lubricants previously commonly employed, both improved melt flow and mold release properties have been impossible to obtain without degradation of the polymer. A lubricant which is suitable for use with a hot melt is not equally efficient when dealing with the cold molded or shaped product of that hot melt, and consequently, in order to obtain the best possible results, a median efficiency lubricant must be chosen, sacrificing optimum melt flow to also gain mold release and vice versa.

Therefore, it is an object of this invention to provide a process for the preparation of polyurethanes having improved flow properties and mold release properties which is devoid of the foregoing disadvantages. It is a further object of this invention to provide polyurethanes containing an inert agent which acts as a lubricant and mold release agent in the processing of polyurethane elastomers. It is a still further object of this invention to provide an inert flow agent for the processing of a polyurethane which is substantially compatible with the elastomeric polyurethane product and has a sufficiently high melt index to facilitate the flow and mold release of the polyurethane elastomeric product. A still further object of this invention is to provide an internally lubricated polyurethane plastic which does not possess an impaired physical appearance or degraded physical and mechanical properties.

These and other objects which will become apparent from the following description are accomplished in accordance with the present invention, generally speaking, by providing a solid polyurethane polymer having dispersed substantially uniformly therein from about 0.2 to 5% by weight of the polyurethane, of a ratio of about 0.5 to 2 parts of a high molecular weight polyolefin to about 1 part of a low molecular weight polyolefin, which polyolefins are solid at room temperature and have a melt index in admixture of at least about 115 as defined below, but preferably at least about 1000, and a process for incorporating said polymers into the polyurethane elastomer.

Any suitable high and low molecular weight polyolefin such as polyethylene, polypropylene and mixtures thereof having a melt index in admixture of at least about 115 under the conditions defined above, but preferably having a melt index of about 1,000 and which is generally solid at room temperature may be used.

The melt index as referred to in conjunction with this invention is a measurement to determine the melt behavior of a polymer, thus indicating the degree of ease with which the polymer flows. Such measurements are made in a capillary rheometer as described in "Journal of Polymer Science," part A, vol. 1, pages 3395 to 3406, 1963. The specific melt index determinations referred to hereinafter were run at one of the two following conditions, depending upon the molecular structure and molecular weight of the polyurethane:

(1) 360° F.; 500 lb. load; orifice L/D of 15.
(2) 400° F.; 500 lb. load; orifice L/D of 15.

This procedure was adapted from ASTM D-1238—62T. The values for the melt index thus arrived at are expressed in grams/10 minutes.

It is to be understood that the designation of the melt index at 115 is under condition (1) above defined, and that any determination of melt index under condition (2) will always give a higher value for the melt index of the identical polymer. Therefore, in the remainder of the specification and in the claims, the designation of melt index shall refer to the melt index as measured under condition (1) hereinbefore defined unless otherwise specified.

It is preferable in the practice of this invention to employ as the high molecular weight polyolefin one which has a molecular weight of from about 100,000 to about 500,000. It has been found that this high molecular weight component when blended into the polyurethane as part of a lubricating agent mixture especially facilitates the processing of polyurethanes maintained at high temperatures. For example, the high molecular weight polymer which acts as an internal lubricant for the transport of the polyurethane melt functions as an aid in the packing and fusing process required in certain shaping and curing processes in order to obtain a good product.

As the low molecular weight polyolefin, it is preferable to employ one which has a molecular weight of from about 1,000 to about 4,000. The low molecular weight component when blended into the polyurethane as part of a lubricating agent mixture is especially advantageous in facilitating the flow of the molten polymer into a cold mold as, for example, in injection molding.

of the high molecular weight polyolefin to low molecular weight polyolefin specified herein is most advantageous since the melt flow and mold release properties of a polyurethane elastomer are not sufficiently improved by the use of the high molecular weight polyolefins alone, and since enough of the low molecular weight component cannot be incorporated into the polyurethane elastomer to sufficiently expedite the processing of the elastomer. Further, even if a larger amount of the low molecular weight polyethylene could be incorporated into the polyurethane elastomer, it would not sufficiently improve the flow of a hot polyurethane melt to warrant the use of it alone as an internal lubricant.

It has been found that the use of a mixture of a high and low molecular weight polyolefins in the ratios stipulated herein as an internal lubricating agent is advantageous for all types of polyurethane elastomers including casting compositions, thermoplastics, and millable gums, and that no degradation of the polyurethane occurs, nor is the lubricating mixture detrimental to the appearance of the product in any way. It is required that one use the prescribed quantity of the mixture of polyolefin polymers to suit the process, however, since an excess will not further expedite the processing of the polyurethane elastomer but will cause blooming, or in other words, the polyolefin polymers will appear as a film or skin on the outside of the molded or calendered or otherwise processed product. Further, if too much of the mixture of polyolefins is added to the polyurethane, the polyolefins will plate out, for instance, on the calender rolls in a calendering operation, and ruin the surface of the product. In addition, a marked stiffening of the polyurethane may occur. However, within the ranges of about 0.2 to about 5% by weight of the mixture of polyolefins calculated on the total weight of polyurethane elastomer, many advantages are readily apparent. For the very best results, however, it is preferred that from about 0.5 to 2.0% by weight of the lubricating mixture be used.

In a comparison of the results of tests of various samples having no additive to improve the flow and those samples in which the lubricant of this invention is incorporated in amounts between about 0.2 and 5%, the collated data shows a decided improvement in the flow properties of the polyurethane elastomers having the polymers of this invention dispersed therein over those in which no such additive is included. For example, a polyurethane control sample has a melt index under the conditions above stated of about 1.3. The same polyurethane elastomer having dispersed therein about 1% by weight of a ratio of about 1 part of a high molecular weight polyethylene to about 1 part of a low molecular weight polyethylene, has a melt index of about 15 under the identical conditions. In addition, with these same samples, superior mold release was noted in the sample containing the mixture of polyethylenes.

In the preferred embodiment of this invention, therefore, polyethylenes are used in a ratio of about 1 part of the high molecular weight polyethylene having a molecular weight of from about 100,000 to about 500,000 to about 1 part of the low molecular weight polyethylene having a molecular weight of from about 1,000 to about 4,000. The amount of this mixture preferably used is between about 0.5 to about 2% by weight calculated on the total weight of the polyurethane elastomeric composition, and it is incorporated into the elastomer in granular or powder form by the process of extrusion.

In the process of this invention, however, the polyolefins can be added to the polyurethane at any desired point in the fabrication of the polyurethane product and by any desired means. For example, a polyethylene mixture may be mixed with any of the components of the polyurethane reaction mixture such as the prepolymer composition or it may be added after the components have been mixed, but before the final product of the reaction is obtained; it may also be added after the polyurethane elastomer has already been prepared. In the latter instance, the lubricating mixture may be blended with the polyurethane in a mixer while both of these components are in powder or granular form, or it may be banburied together with the polyurethane. In addition, although it is generally convenient to add the lubricating mixture of this invention to the polyurethane elastomeric composition in granular or particulate form, in some cases, as where casting compositions are being fabricated, it may be desirable and even necessary to add the lubricant in liquid form. In such instances, these polymers may be heated to a melt and added to the polyurethane at any desired point in the process of preparation of the polyurethane in that form. The mixture may also be worked into the polyurethane substantially uniformly while it is being milled after which it is sheeted off and shaped into the desired final product. The polyurethane containing the lubricating polyolefin polymers may also be extruded to effect a blend of the polymer in the polyurethane and thus achieve ease of handling by the superior lubricity obtained, and in fact, this latter means of incorporation is preferred.

The high and low molecular weight polyolefin polymers may also be added, if desired, a different times in different steps in the procedure rather than being added together in admixture.

The internally lubricant polyurethane product obtained by any of these means may then be calendered, injection molded, extruded, or processed in any desired manner with superior flow and release properties. The polyurethane polymer remains undegraded by the polymeric lubricant while the products are noted to be vastly improved with regard to hydrolysis resistance over any products obtained with the previosuly used stearate lubricants.

In the preparation of the polyurethane polymers, an organic compound containing active hydrogen atoms which are reactive with —NCO groups is intimately mixed with an organic polyisocyanate, and if desired, a chain extending agent.

Any suitable organic compound containing active hydrogen atoms which are reactive with —NCO groups, such as, for example, hydroxyl polyesters, polyhydric polyalkylene ethers, polyhydric polythioethers, polyacetals and the like may be used.

Any suitable hydroxyl polyester may be used, such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxy-methyl-cyclohexane) and the like. The hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the composition set forth of preparing polyesters. Any suitable amine may be used such as, for example, ethylene diamine, propylene diamine, tolylene diamine and the like. Any suitable amino alcohol, such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxy groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid, such as those mentioned above, with relation to the preparation of polyesters. Any suitable ether glycol may be used, such as, for example, diethylene glycol, triethylene glycol, 1,4-phenylene-bis-hydroxy ethyl ether, 2,2'-diphenyl propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, butylene glycol, amylene glycol, trimethylol propane, glycerine, pentaerythritol, hexanetriol and the like. Any suitable alkylene oxide condensate may also be used such as, for example, the condensate of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the Encyclopedia of Chemical Technology, volume 7, pages 257–262, published by Interscience Publishers in 1951 or in U.S. Patent 1,922,459.

Any suitable polyhydric polyethioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should preferably be substantially linear or only slightly branched and have a molecular weight of at least about 600 and for best results, a molecular weight of from about 1800 to about 3000, an hydroxyl number of from about 75 to about 35, but not more than about 187, and an acid number less than about 2. For best results, linear hydroxyl polyesters of polyalkylene ether glycols should be used.

Any suitable organic polyisocyanate may be used in reaction with the organic compound containing active hydrogen atoms to produce thermoplastically processable polyurethane polymers, such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-transvinylene diisocyanate, diphenylsulphone-4,4'-diisocyanate, dichlorohexamethylene diisocyanate, furfurylidene diisocyanate, 1-chlorobenzene-2,4-diisocyanate, 4,4',4''-triphenylmethane triisocyanate, 2,4,6-tolylene triisocyanate and the like. It is preferred that aromatic diisocyanates be used and for best results, 4,4'-diphenylmethane diisocyanate or tolylene diisocyanate has proven to be especially suitable.

Any suitable chain extending agent containing active hydrogen atoms which are reactive with —NCO groups and having a molecular weight less than about 500 may be used in the formation of the polyurethane, such as, for example, ethylene glycol, propylene glycol, butylene glycol, 1,4-butanediol, butynediol, xylylene glycol, amylene glycol, neopentyl glycol, 2,3-butanediol, 1,4-phenylene-bis-(β-hydroxy ethyl ether), 1,3-phenylene-bis-(β-hydroxyl ethyl ether), bis-(hydroxy methylcyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, toylene diamine, xylylene diamine, 3,3'-dichlorobenzidene, 3,3'-dinitrobenzidene, 4,4' - methylene - bis(2-chloroaniline), 3,3-dichloro-4,4'-biphenyl diamine, 2,6-diamino pyridine, 4,4'-diamino diphenylmethane, and the like; alkanol amines, such as, for example, ethanol amine, amino propyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids, and disulfonic acids such as, adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-aminocapronic acid dihydrazide, gamma-hydroxybutyric hydrazide, bis-semi-carbazide, bis-hydrazine carbonic esters of glycols, such as, many of the glycols heretofore mentioned and the like.

The individual reaction components and the proportion in which they are added can be chosen according to the basic properties desired of the end product. However, for the production of thermoplastic polyurethanes it is preferred that the isocyanate be present in an amount at least sufficient to react with all of the active hydrogen atoms present and particularly in an amount such that a slight excess is present based on the active hydrogen atoms present in other reaction components. For best results, it is preferred that the —NCO/OH ratio is from about 1.0 to about 1.3.

In the preparation of a thermoplastic polyurethane polymer, the reaction between the active hydrogen atoms and the —NCO group must be interrupted at some point prior to that at which substantial cross-linking occurs in order to achieve the thermoplastic properties necessary. One method of accomplishing this is to cool the polyurethane reaction mixture beyond the point where further chemical reaction takes place as son as solidification occurs and it can be easily handled.

The organic compound containing active hydrogen containing groups, the organic diisocyanate, and the chain extender are individually heated to preferably a temperature of from about 60° C. to about 135° C. and then the said organic compound and chain extender are substantially simultaneously mixed with the diisocyanate. In a preferred embodiment, the chain extender and the organic compound containing active hydrogen containing groups, each of which has been previously heated, are first mixed and the resulting mixture is combined with the heated diisocyanate. This method is preferred for the reason that the chain extender and the active hydrogen containing resin will not react prior to the introduction of the isocyanate and rapid mixing with the diisocyanate is thus facilitated. The mixing of the organic compound having reactive hydrogen atoms, the chain extender and diisocyanate may be suitably carried out by using any mechanical mixer such as, one equipped with a stirrer which results in intimate mixing of the three ingredients in a short period of time. If the material begins to become too thick, either the temperature may be lowered or a small amount of citric acid or the like of from about 0.001 to about 0.050 part by weight based on 100 parts of the active hydrogen containing resin, i.e., polyester or the like, may be added to slow down the reaction. Of course, to increase the rate of reaction, any suitable catalyst may be added to the reaction mixture, such as, tertiary amines and the like, as set forth in U.S. Patents 2,620,516; 2,621,-166 and 2,729,618. The reaction mixture, after complete mixing, is next poured onto a table or conveyor and preferably maintained at a temperature of from about 60° C. to about 135° C. and permitted to remain on the table or conveyor until it solidifies into a slab which is still a thermoplastic and can be easily removed and reduced to the desired particle size. To facilitate the ready removal of the material from the hot plate, table or conveyor, the slab may be cut or scored. This cutting or scoring is best done while the reaction mixture on the heated table is still soft, since, when the material hardens, it becomes difficult to cut, although it can still be readily reduced in size by grinders, choppers or any other equipment known in the industry. The thermoplastic polyurethane thus produced is then added to a Banbury mixer together with about 1% of a mixture of 1 part of a high molecular weight polyethylene to 1 part of a low molecular weight polyethylene in particulate form, and these materials are intimately mixed to effect a blend which may then be extruded, calendered, injection molded or the like.

The organic compound containing active hydrogen atoms, the polyisocyanate, and the chain extender can also be processed in accordance with what has been called the casting method. In this method, all of the reactants are mixed together and immediately poured, while still liquid into a mold having the shape desired. When the composition in accordance with this invention is utilized in this fashion, it is necessary that the high and low molecular weight polyolefins be incorporated into the composition along with the initial reactants. Thus, for example, one suitable casting composition would comprise a dihydric polyester, an organic diisocyanate, and a chain extender, such as, butanediol, and from about 0.2 to 5.0% by weight of a mixture of a ratio of high molecular weight polyethylenes to low molecular weight polyethylenes. In such processing techniques, it would be necessary that the polyethylene mixture be heated at least until it is liquid. Any suitable casting composition, such as, those disclosed in U.S. Patents 2,729,618 or 2,620,516 may be used.

The compositions, in accordance with this invention, can also be fabricated into the desired configuration by the millable gum method. In this method, an organic compound containing active hydrogen atoms, an organic diisocyanate, and a chain extending agent are mixed together in proportions such that the active hydrogen atoms are in excess. This intermediate which is storage stable because of the terminal hydroxyl groups, can be subsequently milled with a further quantity of an organic polyisocyanate to effect a composition which will cure upon the application of heat. This type of material is generally compression molded into the desired configuration. In accordance with this invention, the polyolefin mixture can be incorporated into the polyurethane composition, either in the manner mentioned above with regard to the casting method, that is, by including the lubricating polymeric mixture at the time of initially mixing the reaction components, or it can be incorporated at the time of milling in the additional quantity of polyisocyanate which is done, as stated, shortly before the final cure is achieved as illustrated in Example 4 below. The polyolefin may also be added separately, if so desired, by incorporating the high molecular weight constituent in the initial mixture of the reactants and adding the low molecular weight constituent at the time of milling.

It can, therefore, be seen that regardless of the manner of fabrication of the particular article, the compositions in accordance with this invention can be used to achieve the desired results, these results being the improved release from those surfaces with which the polyurethane compounds come in contact, in addition to and concurrent with excellent flow properties for the melt form of the polyurethane.

The polyurethane polymers thus prepared in accordance with this invention may be fabricated by injection molding, extrusion, compression molding, calendering, casting, milling and the like, into various final objects such as, for example, ball joints, bushings, shoe soles and heels, shock absorbers, fibers such as spandex, and the like.

The invention is further illustrated, but not limited by the following examples in which all parts and percentages are by weight unless otherwise specified.

EXAMPLE 1

To about 100 parts of a hydroxyl polyester having a molecular weight of about 2,000, an hydroxyl number of about 56, and an acid number of less than 2, prepared by reacting 10 mols of adipic acid and 11 mols of 1,4-butanediol, are added about 35 parts of p-phenylene-bis-($\beta$-hydroxylethylether). After mixing, about 60 parts of 4,4'-diphenylmethane diisocyanate are added. Prior to mixing these ingredients, each is separately heated to a temperature of about 100° C. On the addition of the isocyanate to the polyester mixture, mechanical mixing is conducted for a period of about one minute to insure the intimate contact of the ingredients at 100° C. This reaction mixture is then cast onto a heated table and maintained at a temperature of about 100° C. to 115° C. for about 7 to 8 minutes. When the reaction mixture solidifies to the point where it can be readily removed and easily chopped, it is removed from the heated table and permitted to come to room temperature.

The solidified polymer is then chopped into particles and divided into three portions designated as A, B, and C. To portion A is added 0.5% of the polyurethane of a polyethylene having a molecular weight of about 2,000 and a melt index of about 10,000 and 0.5% of the polyurethane of a polyethylene having a molecular weight of about 150,000 and a melt index of 500.

About 0.75% of a polyethylene having a molecular weight of about 2,000 and a melt index of about 10,000 and 0.75% of the polyurethane of a polyethylene having a molecular weight of about 150,000 and a melt index of about 500 is added to portion B.

Portion C contains no additive and was used as a control.

Each portion is individually mixed in a Banbury mixer for 10 minutes at about 200° C. and the melt flow values are determinned under melt index condition (2) herein defined. The values determined for the internally lubricated and control polyurethane are:

Melt index

Portion A _____ 2.6
Portion B _____ 6.8
Portion C _____ 0.5

EXAMPLE 2

To about 100 parts of a hydroxyl polyester having a molecular weight of about 2,000, an hydroxyl number of about 55, and an acid number of less than 2, prepared by reacting 10 mols of adipic acid and 11 mols of 1,4-butanediol are added about 34 parts of p-phenylene-bis-($\beta$-hydroxylethylether). After mixing, about 60 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about one minute at about 100° C. to insure intimate contact of the ingredients. This reaction mixture is then cast onto a heated table and maintained at a temperature of about 100° C. for about 7 to 8 minutes. When the reaction mixture solidifies to the point where it can be readily removed and easily chopped, it is removed from the heated table and permitted to come to room temperature. The material is then chopped into particles and divided into two portions designated as A and B. To portion A is added and blended therewith about 0.75% based on the weight of the polyurethane of a polyethylene having a molecular weight of about 2,000 and a melt index of about 10,000 under condition (2) and about 0.5% of a polyethylene having a molecular weight of about 150,000 and a melt index of about 500 under condition (2). Portion B is a control sample which contains no additive.

Each portion is then extruded through a heated die, and the strands are cut into pellets. Melt index values determined for the pellets thus obtained measured under condition (2) show values of about 24 for portion A and 4 for portion B. Consequently, in subsequent injection molding processing of polyurethanes A and B wherein shoe heels were fabricated, the pellets of portion A show superior mold flow and release properties in comparison with the pellets of portion B.

EXAMPLE 3

To about 100 parts of a hydroxyl polyester having a molecular weight of about 2,000, an hydroxyl number of about 55, and an acid number of less than 2, prepared by reacting 10 mols of adipic acid and 11 mols of 1,4-butanediol are added about 20 parts of p-phenylene-bis-(β-hydroxylethylether). After mixing, about 40 parts of 4,4'-diphenylmethane diisocyanate are added. Prior to mixing these ingredients, each is separately heated to a temperature of about 105° C. On the addition of the isocyanate to the polyester mixture, mechanical mixing is conducted for a period of about one minute at a temperature of about 100° C. to insure the intimate contact of the ingredients. This reaction mixture is then cast onto a heated table and maintained at a temperature of about 100° C. for about 7 to 8 minutes. When the reaction mixture solidifies to the point where it can be readily removed and easily chopped, it is removed from the heated table and permitted to come to room temperature. The material is then chopped into particles and divided into two portions designated as A and B. To portion A is added and blended therewith 0.5% based on the weight of the polyurethane of a polyethylene having a molecular weight of about 1500 and a melt index of about 10,000 and 0.5% of a polyethylene having a molecular weight of about 150,000 and a melt index of about 500. Portion B is a control sample which contains no additive.

Each portion is then extruded through a heated die, and the strands are cut into pellets. Melt index values determined for the pellets thus obtained measured under condition (1) show values of about 19 for portion A and 4 for portion B. When treated on a heated roll mill, portion A showed superior release properties in comparison with portion B.

Although the invention has been described in considerable detail for the purposes of illustration, it is to be understood that variations may be made therein by those skilled in the art without departing from the spirit and scope of the invention except as set forth in the claims.

What is claimed is:

1. As a new composition of matter, a polyurethane polymer having dispersed substantially uniformly therein, a high molecular weight polyolefin and a low molecular weight polyolefin selected from the group consisting of polyethylene, polypropylene and mixtures thereof, said weight of from about 100,000 to 500,000 and said low molecular weight polyolefin having a molecular weight of from about 1,000 to 4,000, the total quantity of said high and said low molecular weight polyolefins being from about 0.2 to 5% of the polyurethane, a mixture of said high and said low molecular weight polyolefins within the said ratio having a melt index of at least about 115.

2. As a new composition of matter, a polyurethane polymer having dispersed substantially uniformly therein, a high molecular weight polyolefin and a low molecular weight polyolefin selected from the group consisting of polyethylene, polypropylene and mixtures thereof, said high molecular weight polyolefin having a molecular weight of from about 100,000 to 500,000 and said low molecular weight polyolefin having a molecular weight of from about 1,000 to 4,000, said high molecular weight polyolefin being present in a ratio of about .5 to 2 parts per part of said low molecular weight polyolefin, the total quantity of said high and said low molecular weight polyolefin being from about 0.2 to 5% by weight of the polyurethane, a mixture of said high and said low molecular weight polyolefins within said ratio having a melt index of at least about 115.

3. As a new composition of matter a polyurethane polymer having dispersed substantially uniformly therein a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefins being from about 0.2 to 5% by weight of the polyurethane, a mixture of said high and said low molecular weight polyolefins within said ratio and molecular weight range having a melt index of at least about 115.

4. As a new composition of matter, a polyurethane polymer prepared by reacting an organic compound containing active hydrogen atoms which are reactive with isocyanate groups, said organic compound having a molecular weight of at least about 600, with an organic polyisocyanate and dispersing substantially uniformly therein a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefins being from about 0.2 to 5% by weight of the polyurethane, a mixture of said high and said low molecular weight polyolefins within said ratio and molecular weight range having a melt index of at least about 115.

5. As a new composition of matter, a solid polyurethane polymer prepared by reacting an organic compound containing active hydrogen atoms which are reactive with isocyanate groups, a said chain extender having active hydrogen atoms and having a molecular weight less than about 500, and an organic polyisocyanate and dispersing substantially uniformly therein a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and low molecular weight polyolefins being from about 0.2 to 5% by weight of the polyurethane, a mixture of said high and said low molecular weight polyolefins within said ratio and molecular weight range having a melt index of at least about 115.

6. As a new composition of matter, a solid polyurethane polymer prepared by reacting an organic compound containing active hydrogen atoms which are reactive with isocyanate groups, said organic compound having a molecular weight of at least about 600 and selected from the group consisting of hydroxyl polyesters prepared by reacting a polyhydric alcohol with a polycarboxylic acid, polyhydric polyalkylene ethers, polyhydric polythioethers, and polyacetals, with an organic polyisocyanate and a chain extending agent containing active hydrogen atoms and having a molecular weight of less than 500 and dispersing substantially uniformly therein a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefins being from about 0.2 to 5% by weight of the polyurethane, a mixture of said high and said low molecular weight polyolefins within said ratio and molecular weight range having a melt index of at least about 115.

7. The composition of claim 4 in which the chain extender is 1,4-phenylene-bis-(β-hydroxyethylether).

8. The composition of claim 4 in which the chain extender is 1,4-butanediol.

9. The composition of claim 4 in which the diisocyanate is tolylene diisocyanate.

10. The composition of claim 4 in which the diisocyanate is 4,4'-diphenylmethane diisocyanate.

11. A method for making a polyurethane adapted to be shaped which comprises mixing a polyurethane substantially uniformly with a high molecular weight polyolefin and a low molecular weight polyolefin selected from the group consisting of polyethylene, polypropylene and mixtures thereof, said high molecular weight polyolefin having a molecular weight of from about 100,000 to 500,000 and said low molecular weight polyolefin having a molecular weight of from about 1,000 to 4,000, the total quantity of said high and said low molecular weight polyolefins being from about 0.2 to 5% of the polyurethane, a mixture of said high and said low molecular weight polyolefins within the said ratio having a melt index of at least about 115.

12. A method for shaping and curing a polyurethane which comprises charging a shaping device with an uncured internally lubricated polyurethane composition prepared by dispersing substantially uniformly therein a high molecular weight polyolefin and a low molecular weight polyolefin selected from the group consisting of polyethylene, polypropylene and mixtures thereof, said low molecular weight polyolefin having a molecular weight of from about 1,000 to 4,000 and said high molecular weight polyolefin having a molecular weight of from about 100,000 to 500,000, said high molecular weight polyolefin being present in a ratio of about 0.5 to 2 parts per part of said low molecular weight polyolefin, the total quantity of said high and said low molecular weight polyolefin being from about 0.2 to 5% of the polyurethane, a mixture of said high and said low molecular weight polyolefins within the ratio and molecular weight range having a melt index of at least about 115.

13. A method for improving the melt flow and mold release properties of polyurethane elastomers which comprises mixing together an organic polyisocyanate, an organic compound having hydrogen atoms reactive with isocyanato groups and a molecular weight of at least about 600, an hydroxyl number of not more than about 185 and an acid number of less than about 2, and a chain extender and reacting the mixture until a solid thermoplastic polyurethane is obtained, and thereafter shaping and curing the said polyurethane, the improvement which comprises dispersing substantially uniformly therein a high molecular weight polyolefin and a low molceular weight polyolefin, selected from the group consisting of polyethylene, polypropylene, and mixtures thereof, said high molecular weight polyolefin having a molecular weight of from about 100,000 to 500,000 and said low molecular weight polyolefin having a molecular weight of from about 1,000 to 4,000, the total quantity of said high and said low molecular weight polyolefins being from about 0.2 to 5% of the polyurethane, a mixture of said high and said low molecular weight polyolefins within said ratio and molecular weight range having a melt index of at least about 115.

14. A method of improving the melt flow and mold release properties of polyurethane elastomer compositions which comprises dispersing substantially uniformly therein a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefins being from about 0.2 to 5% of the polyurethane, a mixture of said high and said low molecular weight polyolefins within said ratio and molecular weight range having a melt index of at least about 115.

15. A method of improving the melt flow and mold release properties of polyurethane elastomer compositions which comprises incorporating a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefin being from about 0.2 to 5% of the polyurethane, a mixture of said high and said low molecular weight polyolefins within said ratio and molecular weight range having a melt index of at least about 115 into the components of the reaction mixture in the preparation of the polyurethane elastomer.

16. In a method for improving the melt flow and mold release properties of polyurethane elastomer compositions which comprises mixing together an organic polyisocyanate, an organic compound having hydrogen atoms reactive with isocyanato groups and a molecular weight of at least about 600, an hydroxyl number of not more than 185 and an acid number of less than about 2, and reacting the mixture until a millable polyurethane gum is obtained which is thereafter treated with additional polyisocyanate, the improvement which comprises milling the polyurethane with a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefin being from about 0.2 to 5% of the polyurethane, a mixture of said high and said low molecular weight polyolefins within said ratio and molecular weight range having a melt index of at least about 115 until the said high molecular weight and the said low molecular weight polyethylene is uniformly dispersed therein, sheeting off the polyurethane and shaping it.

17. In a method for improving the melt flow and mold release properties of polyurethane elastomeric compositions which comprises mixing together an organic polyisocyanate, an organic compound having hydrogen atoms reactive with isocyanato groups and a molecular weight of at least about 600, an hydroxyl number of not more than about 185 and an acid number of less than about 2, and a chain extender and pouring the reaction mixture onto a table and curing it to a solid slab form, the improvement which comprises scoring the polyurethane slab and feeding it into a Banbury mixer together with a high molecular weight polyolefin and a low molecular weight polyolefin selected from the group consisting of polyethylene, polypropylene and mixtures thereof, said high molecular weight polyolefin being present in a ratio of about 0.5 to 2 parts per part of said low molecular weight polyolefin, said high molecular weight polyolefin having a molecular weight of from about 100,000 to 500,000 and said low molecular weight polyolefin having a molecular weight of from about 1,000 to 4,000, the total quantity of said high and said low molecular weight polyolefin being from about 0.2 to 5% by weight of the polyurethane, a mixture of said high and said low molecular weight polyolefins within said ratio and molecular weight range having a melt index of at least about 115, and mixing these materials to effect a blend which is then fed into the hopper of an extruder to produce a plurality of strands which are pelltized for use in shaping and molding processes.

References Cited by the Examiner

UNITED STATES PATENTS 3,272,890  9/1966  O'Leary _____ 260—859

MURRAY TILLMAN, *Primary Examiner.*

PAUL LIEBERMAN, *Assistant Examiner.*